United States Patent
Shigenobu et al.

(10) Patent No.: US 7,630,199 B2
(45) Date of Patent: Dec. 8, 2009

(54) PARTS COMBINING STRUCTURE, AND ELECTRONIC APPARATUS

(75) Inventors: Naoya Shigenobu, Ome (JP); Kohei Wada, Tachikawa (JP); Yasuyuki Suzuki, Tachikawa (JP); Yosuke Miura, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 373 days.

(21) Appl. No.: 11/818,472

(22) Filed: Jun. 13, 2007

(65) Prior Publication Data
US 2007/0293005 A1 Dec. 20, 2007

(30) Foreign Application Priority Data
Jun. 20, 2006 (JP) .............................. 2006-170443

(51) Int. Cl.
*G06F 1/16* (2006.01)

(52) U.S. Cl. .................. 361/679.55; 386/125; 264/529; 343/712; 257/778

(58) Field of Classification Search ................. 257/679, 257/686, 778; 264/319, 529, 45.54, 37.3, 264/154; 474/94, 199; 492/46; 343/712, 343/713; 359/449, 460; 361/679.09, 679.3, 361/679.55, 679.15, 679.26
See application file for complete search history.

(56) References Cited

U.S. PATENT DOCUMENTS

| 5,174,520 A | 12/1992 | Iwahashi | |
|---|---|---|---|
| 7,019,225 B2 * | 3/2006 | Matsumoto et al. | ......... 200/5 R |
| 2006/0045495 A1 * | 3/2006 | Prabhune et al. | ............ 386/125 |

FOREIGN PATENT DOCUMENTS

| JP | 10-093255 | 4/1998 |
|---|---|---|
| JP | 2004-134835 | 4/2004 |

* cited by examiner

*Primary Examiner*—Hung V Duong
(74) *Attorney, Agent, or Firm*—Blakely, Sokoloff, Taylor & Zafman LLP

(57) ABSTRACT

A parts combining structure is provided with first part having thermoplastic projection, and a second part having through portion to insert the projection. By thermally crushing the distal end of the projection projecting from the through portion, the first part and second part are combined. The through portion of the second part include inlet opened in the outer peripheral edge of the second part. The inlet has an opening width to permit insertion of the projection.

14 Claims, 15 Drawing Sheets

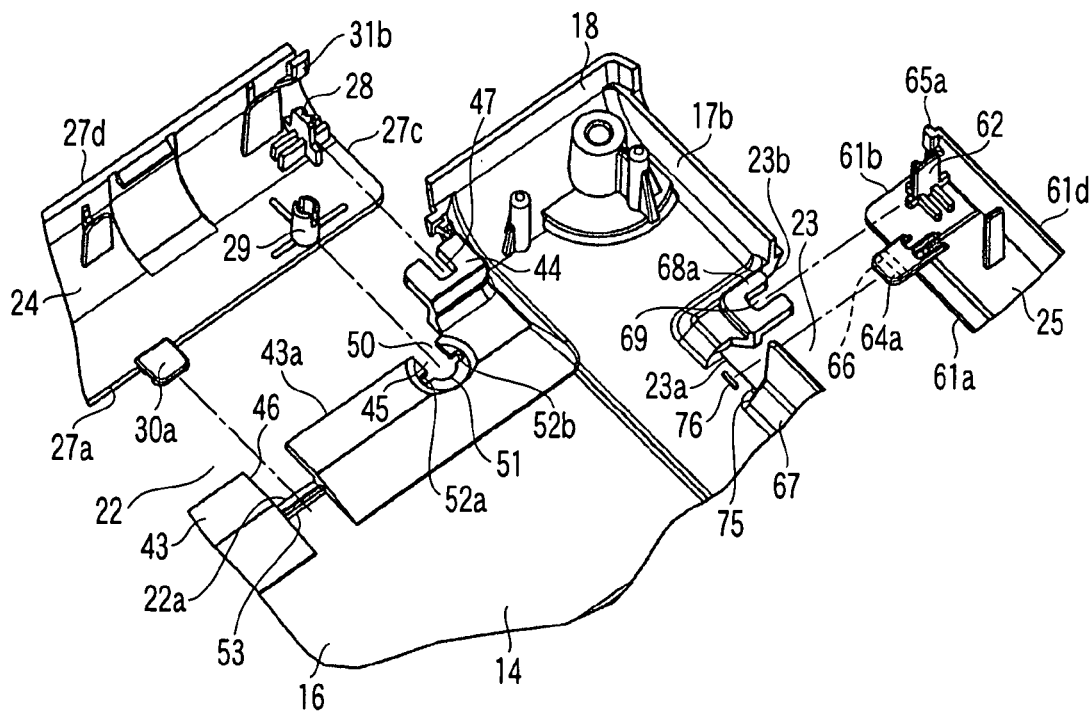
F I G. 19
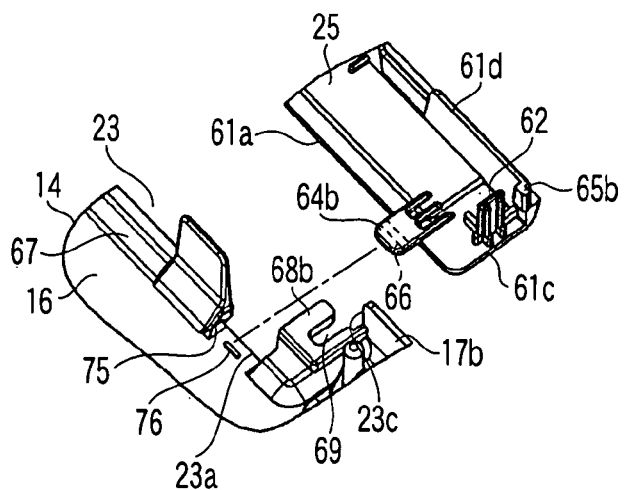
F I G. 20

PARTS COMBINING STRUCTURE, AND ELECTRONIC APPARATUS

CROSS-REFERENCE TO RELATED APPLICATIONS

This application is based upon and claims the benefit of priority from Japanese Patent Application No. 2006-170443, filed Jun. 20, 2006, the entire contents of which are incorporated herein by reference.

BACKGROUND

1. Field

One embodiment of the invention relates to a structure of combining a synthetic resin part and a metallic part, for example. In particular, the embodiment of the invention relates to an electronic apparatus such as a portable computer having a metallic housing covered by a synthetic resin cover, for example.

2. Description of the Related Art

Recently, an electronic apparatus having an antenna element for radio communication contained in a housing have been available in various types. In such an electronic apparatus, it is necessary to eliminate a factor to disturb an electric field radiated from an antenna element for stabilizing radio communication.

Therefore, in an electric apparatus having a metallic housing to contain an antenna element, an opening is formed in the housing at a position corresponding to the antenna element. The opening of the housing is covered by an antenna cover made of synthetic resin. Jpn. Pat. Appln. KOKAI Publication No. 10-93255 discloses an example of a means for fixing a synthetic resin part like an antenna cover to a metallic part like a housing.

According to the above patent application, the metallic part has through holes. The resin part has thermoplastic pins corresponding to the through holes. The resin part is fixed to the metallic part by inserting the pins into the through holes and thermally crushing the distal ends of the pins projected from the through holes.

In this conventional configuration, the through holes to insert the pins are simple round holes penetrating the metallic part in the thickness direction. Thus, when fixing the resin part to the metallic part, the pins must be inserted into the through holes in the axial direction. As a result, the direction of fixing the resin part to the metallic part is largely restricted. Therefore, time and labor are required for fixing the resin part to the metallic part.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 19 is an exemplary perspective view showing positions of the display cover, the first antenna cover and the second antenna cover, in the first embodiment of the invention;

FIG. 20 is an exemplary perspective view showing positions of the display cover and the second antenna cover, in the first embodiment of the invention;

DETAILED DESCRIPTION

Various embodiments according to the invention will be described hereinafter with reference to the accompanying drawings. In general, according to one embodiment of the invention, a parts combining structure comprises a first part having thermoplastic projection, and a second part having through portion to insert the projection. By thermally crushing the distal end of the projection projecting from the through portion, the first part and second part are combined. The through portion of the second part include inlet opened in the outer peripheral edge of the second part. The inlet has an opening width to permit insertion of the projection.

Figure 1:
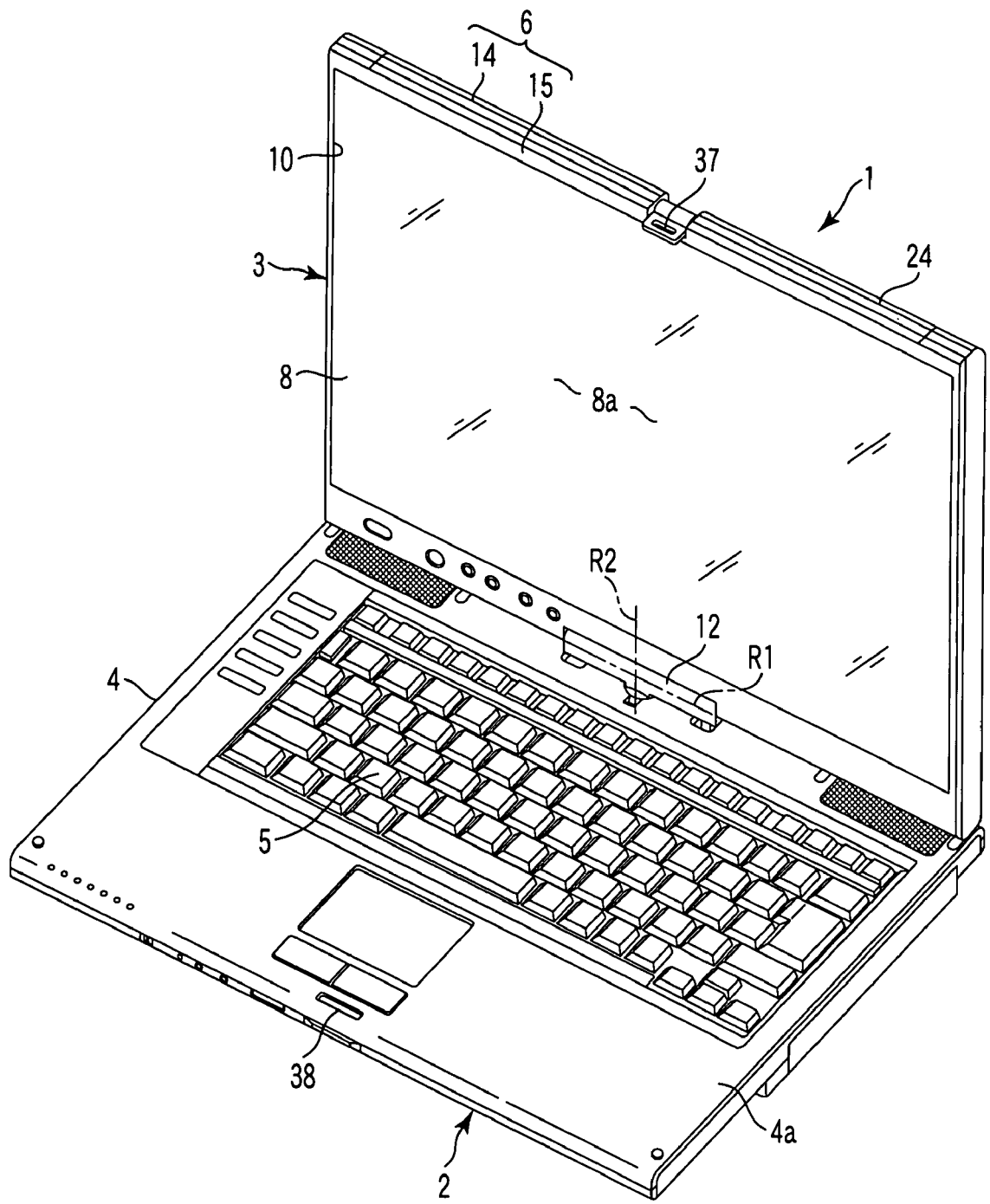
FIG. 1 is a perspective view of an exemplary portable computer according to a first embodiment of the present invention.
Figure 2:
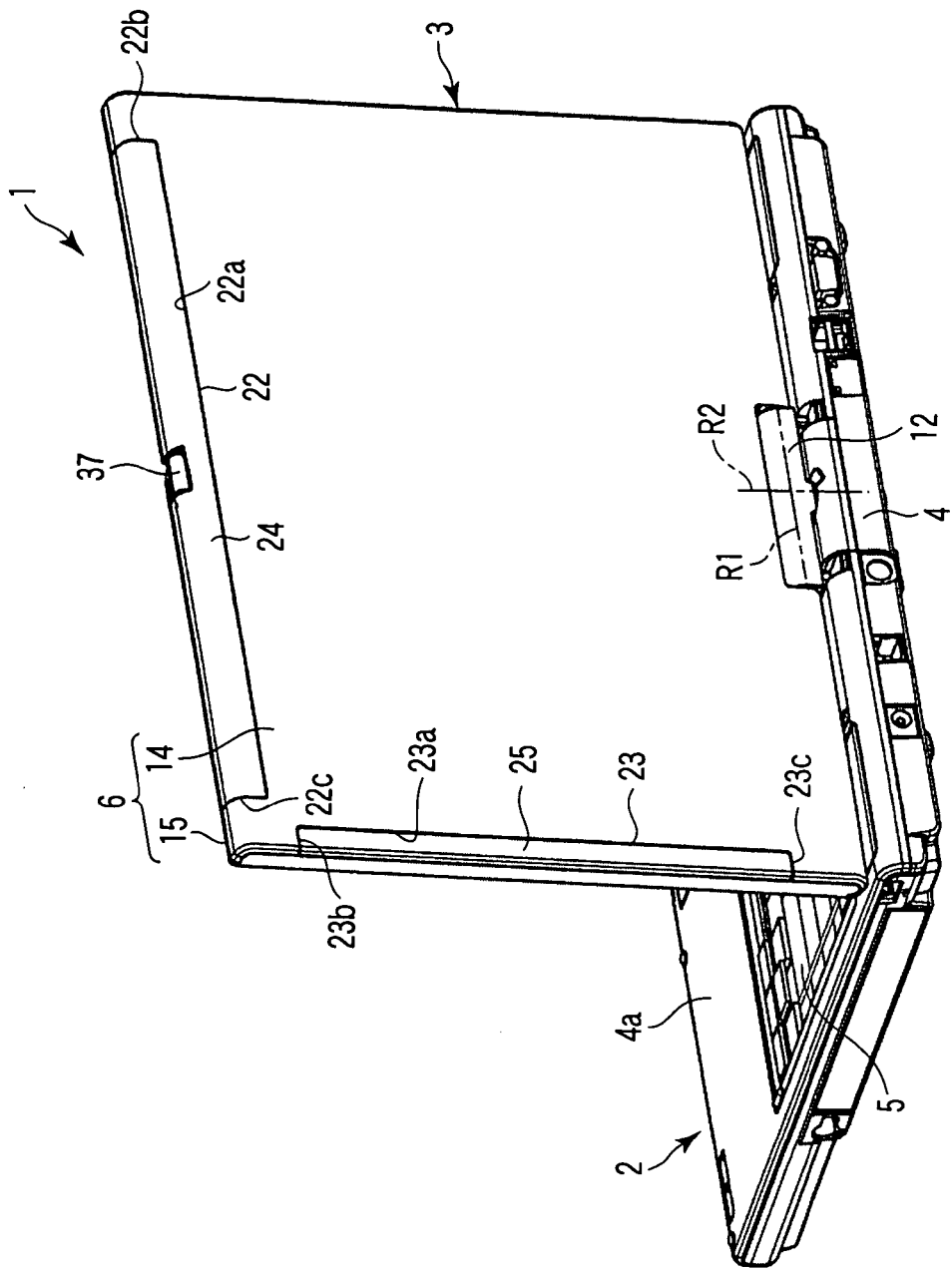
FIG. 2 is an exemplary perspective view of the portable computer with a display unit viewed from the rear side in the first embodiment of the invention.

FIG. 1 and FIG. 2 show a portable computer 1 as an example of an electronic apparatus. The portable computer 1 has a main unit 2 and a display unit 3.

The main unit 2 has a first housing 4. The first housing 4 is shaped like a flat box having a top face 4a. The first housing 4 contains primary constituent elements such as a printed wiring board with a CPU and a hard disc drive. The top face 4a of the first housing 4 supports a keyboard 5.

Figure 3:
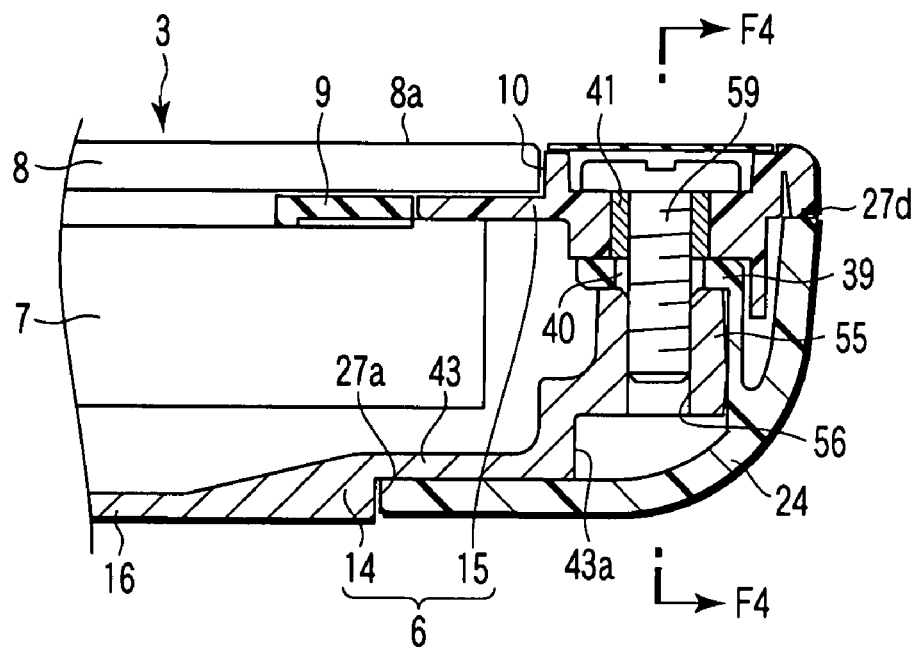
FIG. 3 is an exemplary sectional view of the display unit indicating positions of a second housing, a liquid crystal display panel and a tablet, in the first embodiment of the invention.

The display unit 3 has a second housing 6, a liquid crystal display panel 7, and a tablet 8. The second housing 6 is shaped like a flat box with substantially the same size as the first housing 4. As shown in FIG. 3, the second housing 6 contains the liquid crystal display panel 7 and the tablet 8. The tablet 8 is laid on the liquid crystal display panel 7 through a spacer 9. The tablet 8 has a display surface 8a functioning also as an input surface. The display surface 8a is exposed outside the display unit 3 through an opening 10 formed on the front side of the second housing 6.

The display unit 3 is supported in the rear end portion of the main unit 2 through a hinge mechanism 12. As shown in FIG. 1, the hinge mechanism 12 has a first axis of rotation R1 and a second axis of rotation R2. The first axis of rotation R1 is extended horizontally in the width direction of the main unit 2. The second axis of rotation R2 is perpendicular to the first axis of rotation R1.

The display unit 3 is rotatable around the first axis of rotation between a closed position and an opened position. At the closed position, the display unit 3 is laid on the main unit 2 so as to cover the keyboard 5 from above. At the opened position, the display unit 3 is raised from the rear end portion of the main unit 2 so as to expose the keyboard 5.

Further, in the state moved rotationally to the opened position, the display unit 3 is reversible between a first reverse position and a second reverse position about the second axis of rotation R2. At the first reverse position, the display surface 8a of the display unit 3 is faced to the operator operating the keyboard 5, as shown in FIG. 1. At the second reverse position, the display surface 8a of the display unit 3 is reversed 180°, and the rear side of the second housing 6 is faced to the operator.

When the display unit 3 is reversed from the first reverse position to the second reverse position and then rotationally moved from the opened position to the closed position, the display unit 3 is laid on the main unit 2 in a position with the display surface 8a faced upward.

Therefore, the portable computer 1 switched to handwrite input mode, and information can be input to the display surface 8a by using a stylus pen (not shown).

Figure 5:
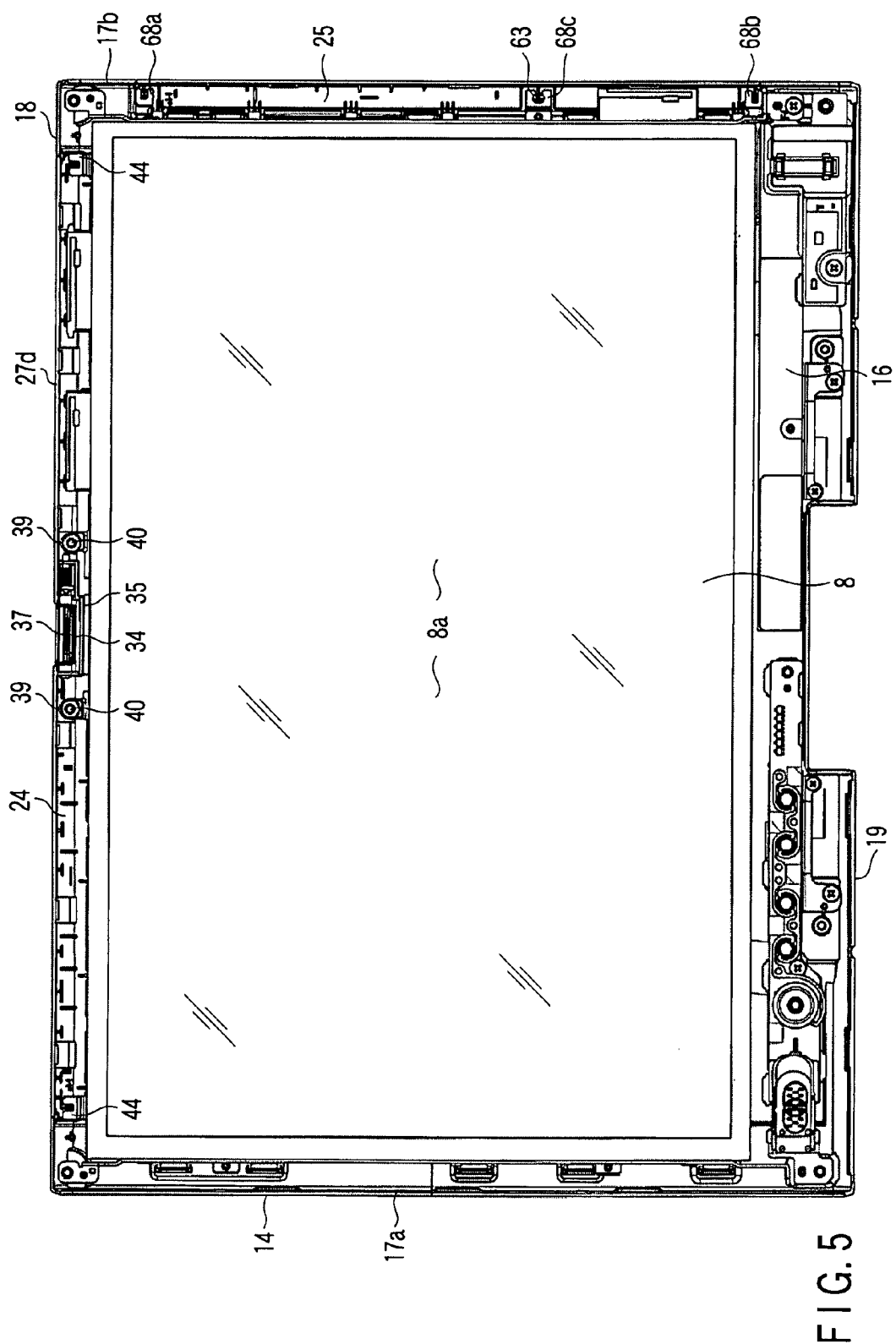
FIG. 5 is an exemplary top plan view showing the state that the liquid crystal display panel and tablet are installed in a display cover, in the first embodiment of the invention.
Figure 6:
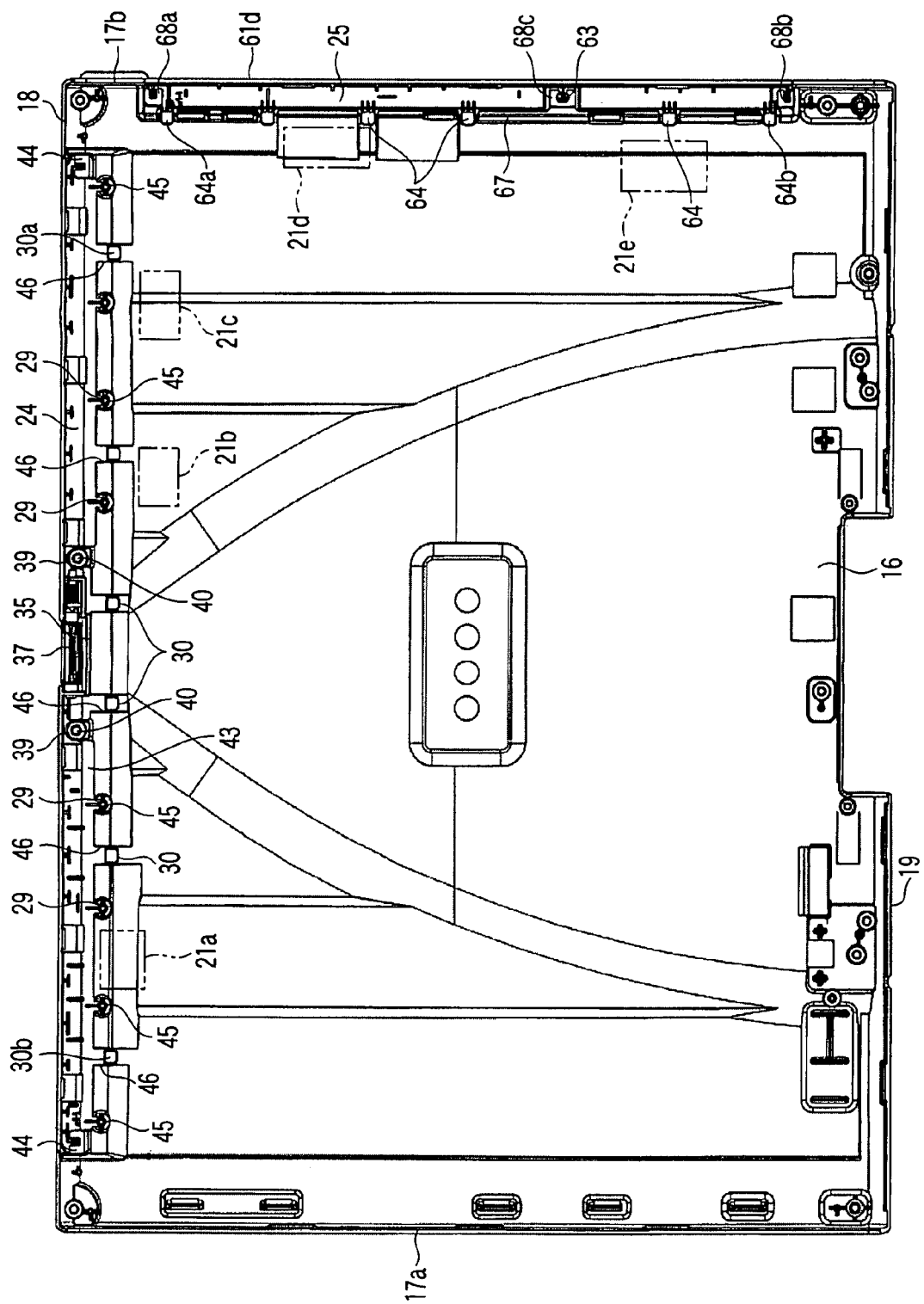
FIG. 6 is an exemplary plan view of the display cover according to the first embodiment of the invention.

As shown in FIG. 1-FIG. 3, the second housing 6 has a display cover 14 and a display mask 15. The display cover 14 is made of metallic material such as magnesium alloy. As shown in FIG. 5 and FIG. 6, the display cover 14 has a support wall 16, left and right sidewalls 17a and 17b, a top wall 18, and a bottom wall 19.

The support wall 16 supports the liquid crystal display panel 7 and the tablet 8, and rises from the main unit 2 when the display unit 3 is rotationally moved to the opened position. The sidewall 17a is positioned at the left side edge of the support wall 16. The sidewall 17b is positioned at the right side edge of the support wall 16. The top wall 18 is positioned at the upper edge of the support wall 16, when the display unit 3 is rotationally moved to the opened position. The bottom wall 19 is positioned at the lower edge of the support wall 16, when the display unit 3 is rotationally moved to the opened position. The top wall 18 and bottom wall 19 are extended in the width direction of the display unit 3.

The display mask 15 is made of synthetic resin material. The display mask 15 has an opening 10, and is removably hung on the sidewalls 17a/17b and top/bottom walls 18/19. Therefore, the display mask 15 surrounds the tablet 8 and the liquid crystal display panel 7.

As shown in FIG. 6, the second housing 6 contains antenna elements 21a, 21b, 21c, 21d and 21e. The antenna elements 21a, 21b, 21c, 21d and 21e are supported in the outer periphery of the support wall 16 of the display cover 14, and at least some of them are positioned between the support wall 16 and the liquid crystal display panel 7.

According this embodiment, three antenna elements 21a, 21b and 21c are adjacent to the top wall 18 of the display cover 14, and arranged side by side with space in the width direction of the second housing 6. The other two antenna elements 21d and 21e are adjacent to the right sidewall 17b of the display cover 14, and arranged side by side with space in the height direction of the second housing 6.

Figure 7:
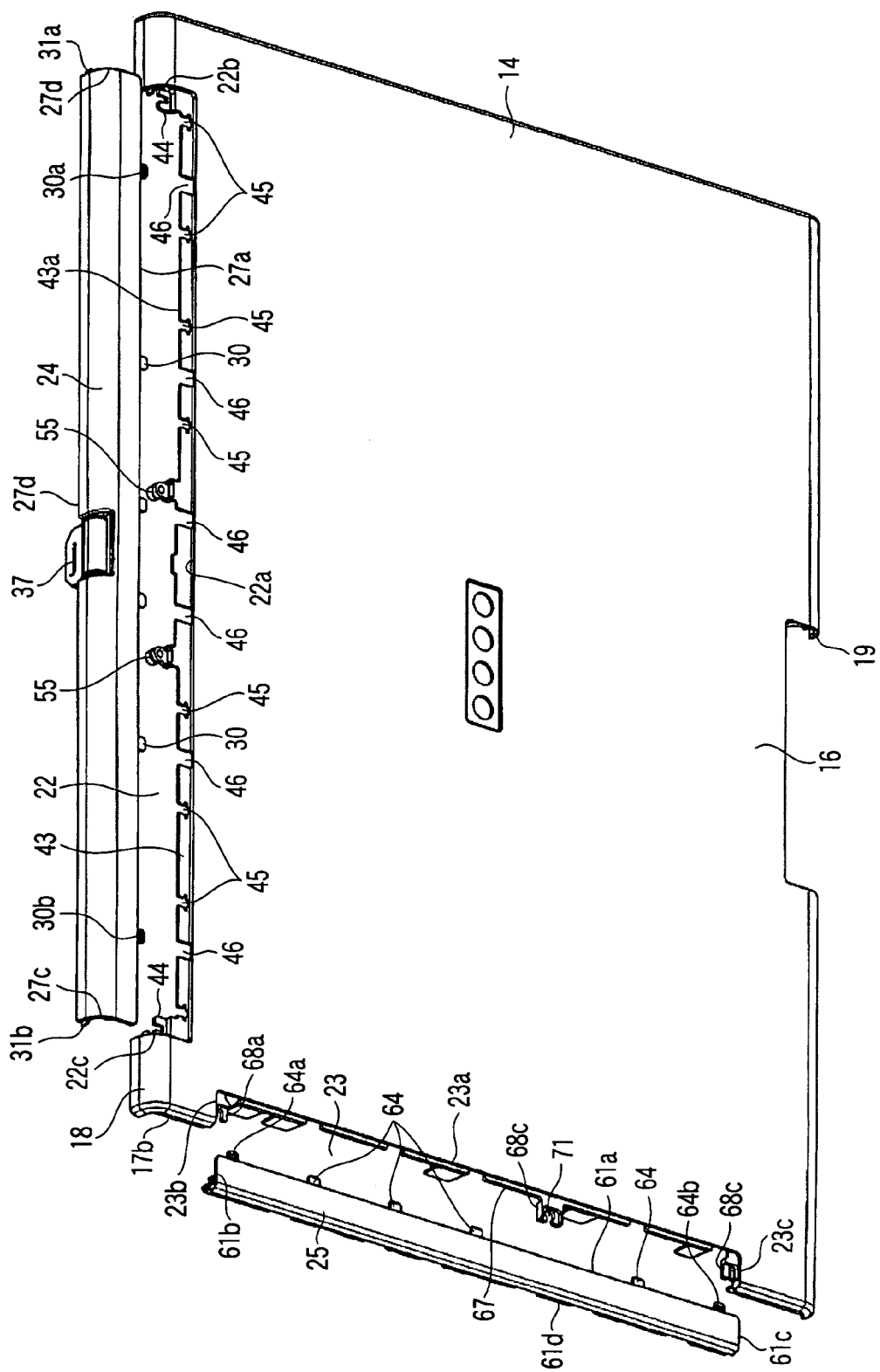
FIG. 7 is an exemplary perspective view showing positions of the display cover, a first antenna cover and a second antenna cover, in the first embodiment of the invention.

As shown in FIG. 7, the metallic display cover 14 has first and second openings 22 and 23 not to disturb electric fields radiated from the antenna elements 21a, 21b, 21c, 21d and 21e.

The first opening 22 is positioned at the corner defined by the support wall 16 and top wall 18 of the display cover 14. The first opening 22 is extended in the width direction of the second housing 6, just like corresponding to three antenna elements 21a, 21b and 21c.

The first opening 22 has first to third open edge portions 22a, 22b and 22c. The first open edge portion 22a is positioned on the support wall 16, and extended linearly in the width direction of the display cover 14. The second open edge portion 22b is extended from one end of the first open edge portion 22a to the top wall 18, crossing the support wall 16. The third open edge portion 22c is extended from the other end of the first open edge portion 22a to the top wall 18, crossing the support wall 16.

The second opening 23 is positioned at the corner defined by the support wall 16 and right sidewall 17b of the display cover 14. The second opening 23 is extended in the height direction of the second housing 6, just like corresponding to two antenna elements 21d and 21e.

The second opening 23 has first to third open edge portions 23a, 23b and 23c. The first open edge portion 23a is positioned on the support wall 16, and extended linearly in the height direction of the display cover 14. The second open edge portion 23b is extended from one end of the first open edge portion 23a to the sidewall 17b, crossing the support wall 16. The third open edge portion 23c is extended from the other end of the first open edge portion 23a to the sidewall 17b, crossing the support wall 16.

The first opening 22 is covered by a first antenna cover 24. Likewise, the second opening 23 is covered by a second antenna cover. The first and second antenna covers 24 and 25 are examples of a first part, and made of thermoplastic synthetic resin material, for example. The first and second antenna covers 24 and 25 are individually fixed to the display cover 14.

Figure 8:
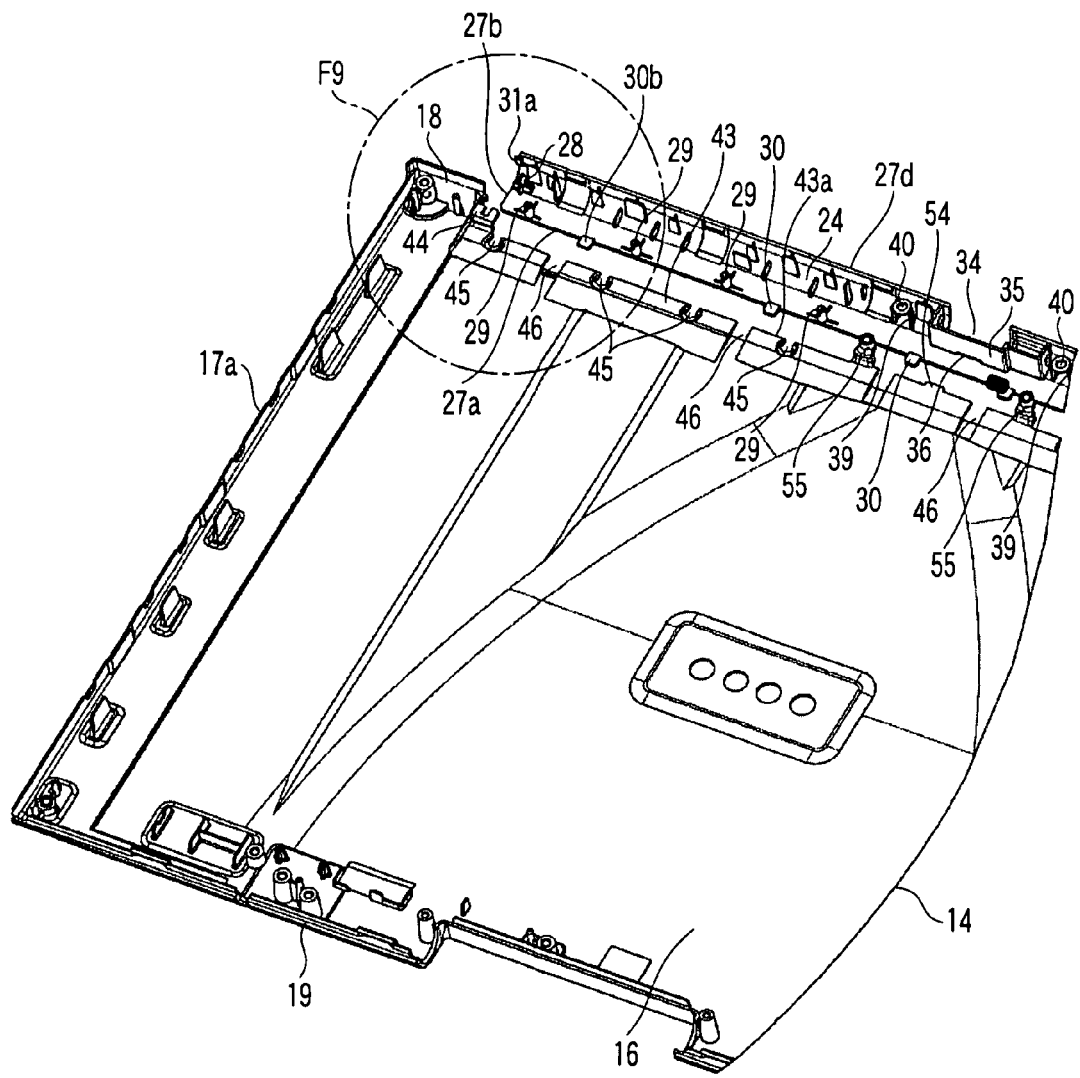
FIG. 8 is an exemplary perspective view showing positions of the display cover and the first antenna cover, in the first embodiment of the invention.

As shown in FIG. 7 and FIG. 8, the first antenna cover 24 is shaped like a slender plate extending in the width direction of the second housing 6. The first antenna cover 24 has a first to fourth edge portions 27a, 27b, 27c and 27d. The first to third edge portions 27a, 27b and 27c of the first antenna cover 24 are butt against the first to third open edge portions 22a, 22b and 22c of the first opening 22. The fourth edge portion 27d of the first antenna cover 24 is butt against the display mask 15.

The first antenna cover 24 has a pair of first projections 28, two or more second projections 29, and two or more first lock lugs 30, second lock lug 31a and third lock lug 31b.

Figure 9:
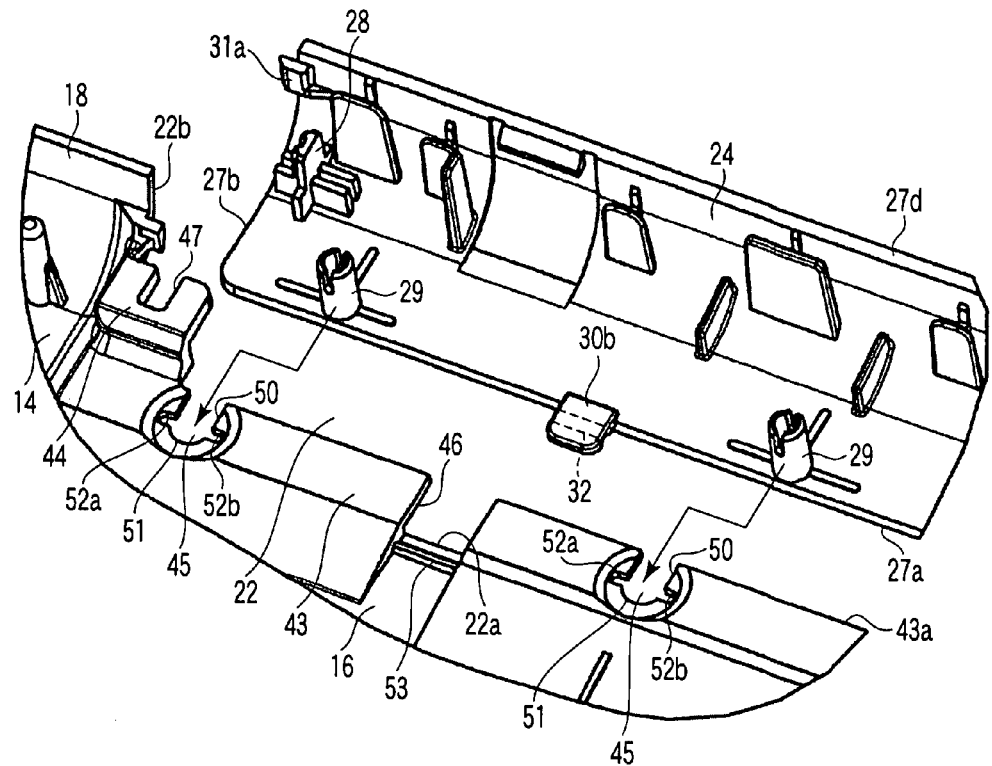
FIG. 9 is an exemplary enlarged perspective view of the part of F9 of FIG. 8.

As shown in FIG. 9 and FIG. 19, each first projection 28 is shaped like a plate projecting from the inside of the first antenna cover 24. One first projection 28 is positioned at one end along the longitudinal direction of the first antenna cover 24, and adjacent to the second edge portion 27b of the first antenna cover 24. The other first projection 28 is positioned at the other end along the longitudinal direction of the first antenna cover 24, and adjacent to the third edge portion 27c of the first antenna cover 24.

Each second projection 29 is shaped like a hollow cylinder projecting from the inside of the first antenna cover 24. The second projections 29 are adjacent to the first edge portion 27a of the first antenna cover 24, and arranged in a line with space in the longitudinal direction of the first antenna cover 24.

Each first lock lug 30 is projected from the first edge portion 27a of the first antenna cover 24 to the support wall 16 of the display cover 14. The first lock lugs 30 are arranged in a line with space in the longitudinal direction of the first antenna cover 24. Each first lock lug 30 is positioned between adjacent second projections 29.

Figure 14:
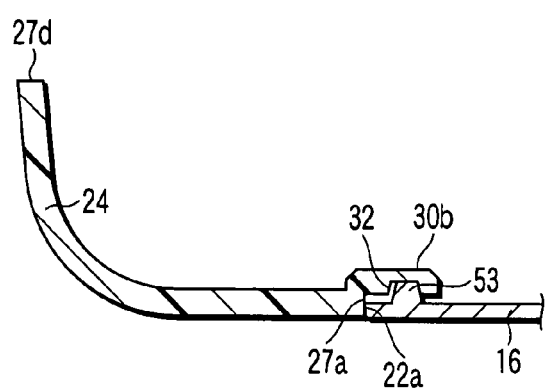
FIG. 14 is an exemplary sectional view taken along lines F14-F14 of FIG. 11.

Among the first lock lugs 30, the first lock lug 30a positioned at one end along the longitudinal direction of the first antenna cover 24 and the first lock lug 30b positioned at the other end along the longitudinal direction of the first antenna cover 24 have a recess 32 as shown in FIG. 14. The recesses 32 are formed on the outside of the first lock lugs 30a and 30b, and extended in the direction orthogonal to the projecting direction of the first lock lugs 30a and 30b.

As shown in FIG. 9, the second lock lug 31a is projected sideways the second edge portion 27b of the first antenna cover 24. As shown in FIG. 19, the third lock lug 31b is projected sideways the third edge portion 27c of the first antenna cover 24.

As shown in FIG. 8, a latch housing portion 34 is formed in the first antenna cover 24. The latch housing portion 34 is positioned at the middle along the longitudinal direction of the first antenna cover 24. The latch housing portion 34 has a partition wall 35 rising from the inside of the first antenna cover 24. The partition wall 35 is extended along the longitudinal direction of the first antenna cover 24. A slit 36 is formed at the lower end of the partition wall 35.

A latch 37 shown in FIG. 7 is housed in the latch housing portion 34. The latch 37 is removably fit in a recess 38 formed in the front end portion of the first housing 4. Then, the display unit 3 is held at the closed position.

Figure 4:
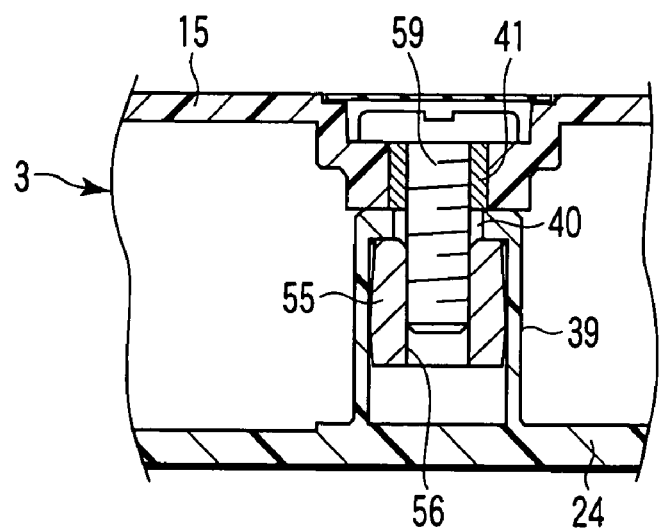
FIG. 4 is an exemplary sectional view taken along lines F4-F4 of FIG. 3.

As shown in FIG. 3, FIG. 4 and FIG. 8, a pair of screw holders 39 is formed inside the first antenna cover 24. The screw holder 39 is shaped like a hollow cylinder, and positioned at the middle along the longitudinal direction of the first antenna cover 24. The latch housing portion 34 is positioned between the screw holders 39.

The screw holder 39 is projected to the display mask 15 from the inside of the first antenna cover 24. A through hole 40 is formed at the projected end of the screw holder 39. The through hole 40 is opened to the display mask 15. The through holes 40 of a pair of screw holders 39 coincide with a pair of screw insertion holes 41 formed in the display mask 15.

The display cover 14 is an example of the second part. The display cover 14 has a first cover support 43 as a part, as shown in FIG. 7 to FIG. 11. The first cover support 43 is positioned at the first open edge portion 22a of the first opening 22, and projected therefrom like a flange to the inside of the first opening 22. The first cover support 43 has a front end edge 43a exposed to the first opening 22. The front end edge 43a is compatible with an outer peripheral edge forming a contour of the display cover 14.

The first cover support 43 has a pair of tongue pieces 44, two or more through portions 45, and two or more notches 46. As shown in FIG. 9 and FIG. 19, the tongue pieces 44 are positioned at one end and the other end along the longitudinal direction of the first opening 22. Each tongue piece 44 has a slit 47 formed at its distal end. The slit 47 corresponds to the first projection 28 of the first antenna cover 24, and has an opening width to permit insertion of the first projection 28.

Figure 11:
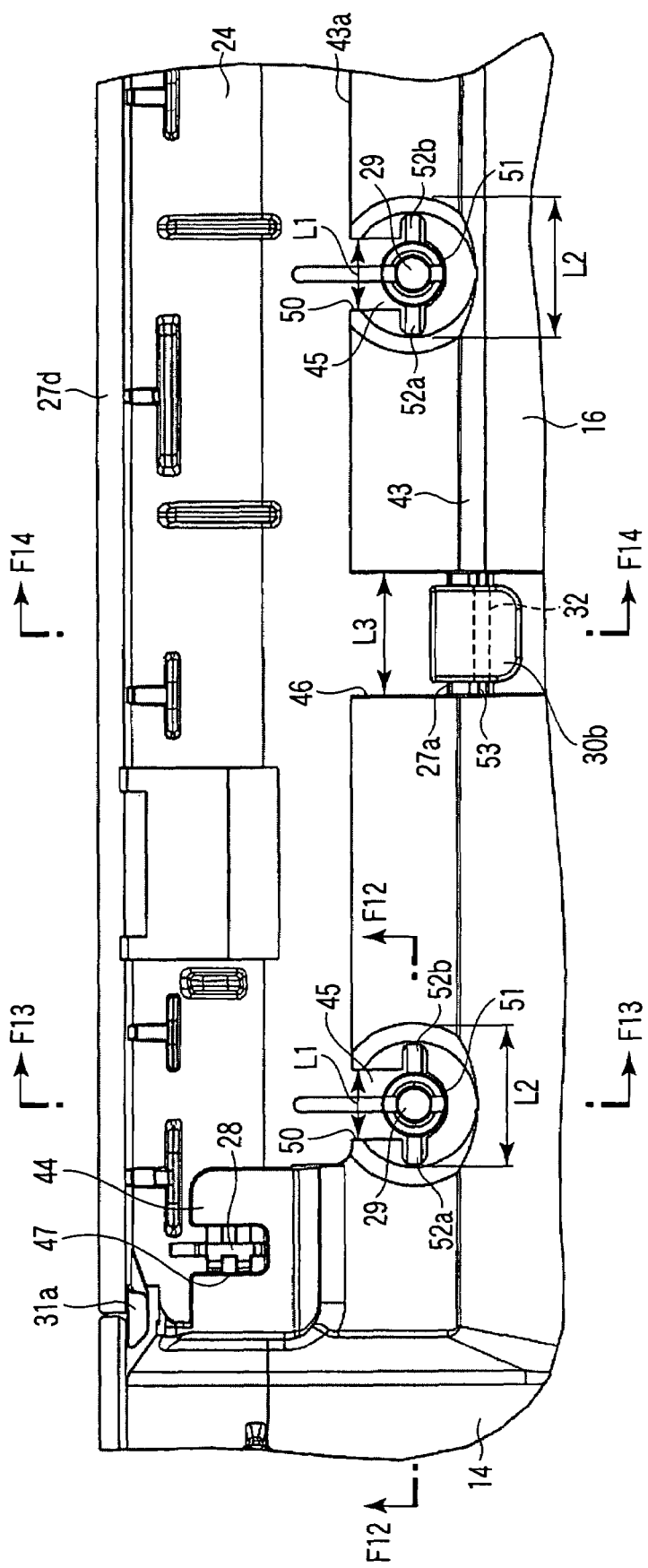
FIG. 11 is an exemplary plan view showing the state that the first antenna cover is fixed to the display cover, in the first embodiment of the invention.
Figure 12:
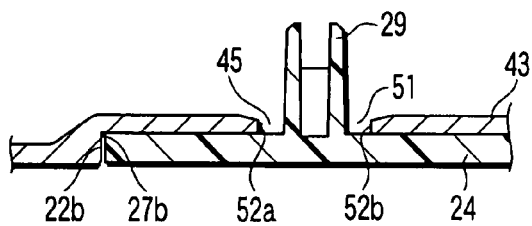
FIG. 12 is an exemplary sectional view taken along lines F12-F12 of FIG. 11.
Figure 13:
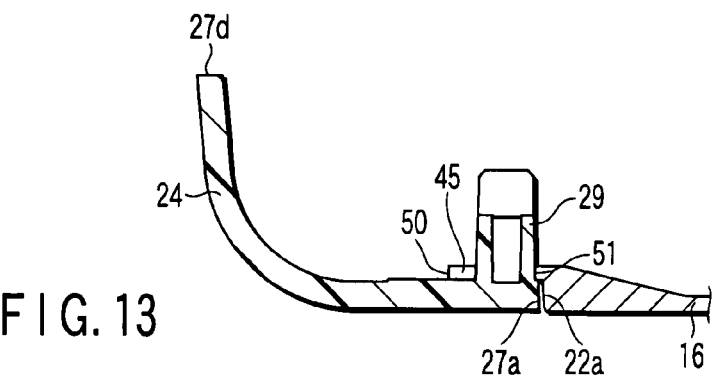
FIG. 13 is an exemplary sectional view taken along lines F13-F13 of FIG. 11.
Figure 17:
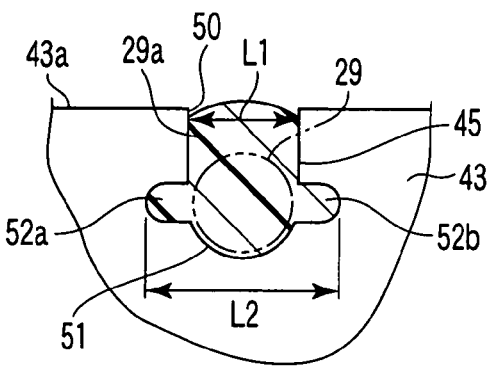
FIG. 17 is an exemplary sectional view showing the state that molten resin is filled in a through portion, in the first embodiment of the invention.

The through portions 45 are arranged in a line with space in the width direction of the display cover 14 so as to correspond to the second projections 29 of the first antenna cover 24. As shown in FIG. 11 and FIG. 17, each through portion 45 has an inlet 50 and a terminal end 51. The inlet 50 is formed at the front end edge 43a of the first cover support 43, and has the opening width L1 to permit insertion of the second projection 29 in the radial direction. The terminal end 51 is connected to the inlet 50.

In other words, each through portion 45 is shaped like a groove made by cutting the first cover support 43 so as to be opened at the front end edge 43a of the first cover support 43. Therefore, the second projections 29 of the first antenna cover 24 can be inserted into the through portions 45 from either axial or radial direction of the second projections 29.

As shown in FIG. 9 and FIG. 17, the terminal end 51 of each through portion 45 includes a pair of grooves 52a and 52b. The grooves 52a and 52b are extended linearly from the position of the terminal end 51 opposite to each other, along the width direction of the terminal end 51. Therefore, the grooves 52a and 52b are formed radially to the terminal end 51 of the through portion 45. In the part corresponding to the grooves 52a and 52b, the terminal end 51 is formed wider than the inlet 50. The opening width L2 of the terminal end 51 is wider than the opening width L1 of the inlet 50.

The notches 46 are arranged in a line with space in the width direction of the display cover 14, so as to correspond to the first lock lugs 30 of the first antenna cover 24. Each notch 46 has the opening width L3 to permit insertion of the first lock lug 30.

As shown in FIG. 9, FIG. 14 and FIG. 19, a pair of lock projections 53 is formed in the support wall 16 of the display cover 14. The lock projections 53 corresponds to the notches 46 positioned at one end and the other end along the width direction of the display cover 14. The lock projections 53 are projected from the inside of the support wall 16, just like facing the notches 46, and extended in the width direction of the display cover 14.

Further, the first cover support 43 of this embodiment has a tab 54 and a pair of bosses 55. As shown in FIG. 8, the tab 54 is extended from the front end edge 43a of the first cover support 43 to the inside of the first opening 22, so as to correspond to the slit 36 of the first antenna cover 24.

As shown in FIG. 3 and FIG. 8, the bosses 55 are projected from the front end edge 43a, so as to correspond to the screw holders 39 of the first antenna cover 24. Each boss 55 has a screw hole 56. The screw hole 56 coincides with the through hole 40 of the screw holder 39, when the first opening 22 is covered by the first antenna cover 24.

As shown in FIG. 9, the first antenna cover 24 is inserted into the first opening 22 from the direction of the top wall 18 of the display cover 14. Then, first projections 28 of the first antenna cover 24 are inserted into the slits 47 of the tongue pieces 44, and the second projections 29 fits into the terminal ends 51 of the through portions 45 through the inlets 50.

The first lock lugs 30 of the first antenna cover 24 fits into the notches 46. The first lock lugs 30 are passed over the first open edge portion 22a, and laid on the inside of the support wall 16. At the same time, the first cover support 43 of the display cover 14 is laid on the inside of first antenna cover 24.

The first lock lugs 30a and 30b positioned at one end and the other end of the first antenna cover 24 have the recess 32. The recess 32 hangs on the lock projection 53 projecting from the inside of the support wall 16, following the insertion of the first antenna cover 24.

When the first antenna cover 24 is inserted into the first opening 22, and the first edge portion 27a of the first antenna cover 24 reaches the position just before the first open edge portion 22a of the first opening 22, the second and third lock lugs 31a and 31b of the first antenna cover 24 rides over the second and third open edge portions 22b and 22c of the display cover 14, and elastically hangs on the top wall 18. Further, the tab 54 of the first cover support 43 hangs in the slit 36 of the first antenna cover 24. Then, the middle part along the longitudinal direction of the first antenna cover 24 is held by the display cover 14.

Figure 10:
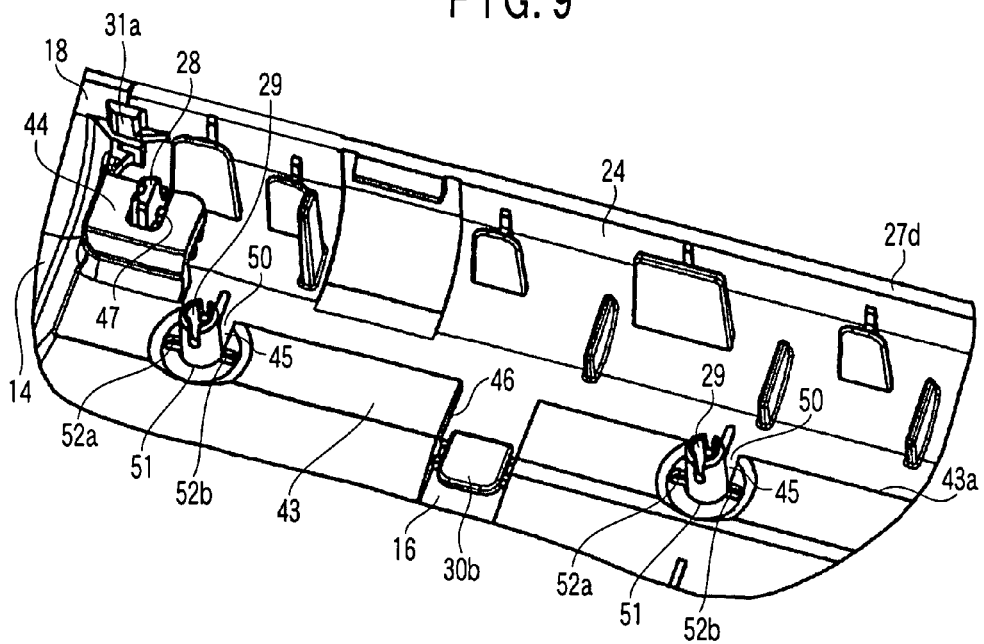
FIG. 10 is an exemplary perspective view showing the state that the first antenna cover is fixed to the display cover, in the first embodiment of the invention.

As a result, as shown in FIG. 10, the first antenna cover 24 is tentatively locked to the display cover 14 through the first to third lock lugs 30, 31a and 31b, and the tab 54. Therefore, the first antenna cover 24 is held at a fixed position of the display cover 14, and the first antenna cover 24 is prevented from displacing or floating from the display cover 14.

Further, the first projections 28 are held in the state inserted into the slits 47, and the positions of the first projections 28 against the slits 47 are fixed. Similarly, the second projections 29 are held in the state inserted into the through portions 45, and the positions of the second projections 29 against the through portions 45 are fixed.

In the state that the first antenna cover 24 is tentatively fixed to the display cover 14, mount the display cover 14 on a heating unit (not shown). The heating unit has heating heads corresponding to the first and second projections 28 and 29. The heating heads contact the distal ends of the first projections 28 projected from the slits 47, and the distal ends of the second projections 29 projected from the through portions 45. Thus, the first and second projections 28 and 29 are molten and thermally crushed.

Figure 15:
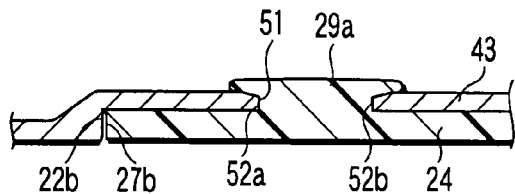
FIG. 15 is an exemplary sectional view showing the state that a second projection is thermally crushed, in the first embodiment of the invention.
Figure 16:
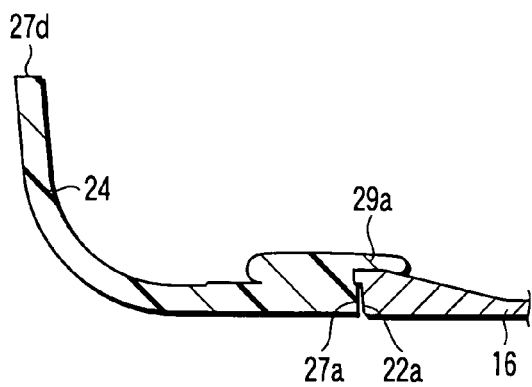
FIG. 16 is an exemplary sectional view showing the state that the second projection is thermally crushed, in the first embodiment of the invention.

Describing in detail, when the first projections 28 are heated, the molten resin is spread over the tongue pieces 44, and filled in the slits 47. Similarly, when the second projections 29 are heated, the molten resin 29a is spread over the first cover support 43, and filled in the through portions 45, as shown in FIG. 15 to FIG. 17.

Particularly, as each second projection 29 is shaped like a hollow cylinder, it is softened evenly and swiftly when the heating head is pressed to it. Therefore, the molten resin 29a easily flows into the through portion 45, and the workability in melting the second projection 29 is improved. When the molten resin 29a is hardened in the through portion 45, the first antenna cove 24 is fixed to the display cover 14 in the state clogging the first opening 22.

The display mask 15 is fit to the display cover 14, after the first antenna cover 24 is fixed to the display cover 14. As shown in FIG. 3 and FIG. 4, in the state that the display mask 15 is being fit to the display cover 14, the screw insertion holes 41 of the display mask 15 coincides with the through holes 40 of the screw holders 39.

Fixing screws 59 are inserted into the screw insertion holes 41 of the display mask 15. The fixing screws 59 are screwed into the screw holes 56 of the bosses 55, passing through the through holes 40 of the screw holders 39. Therefore, the fixing screws 59 fixes the middle part along the width direction of the first antenna cove 24 to the display cover 14 together with the display mask 15.

Figure 18:
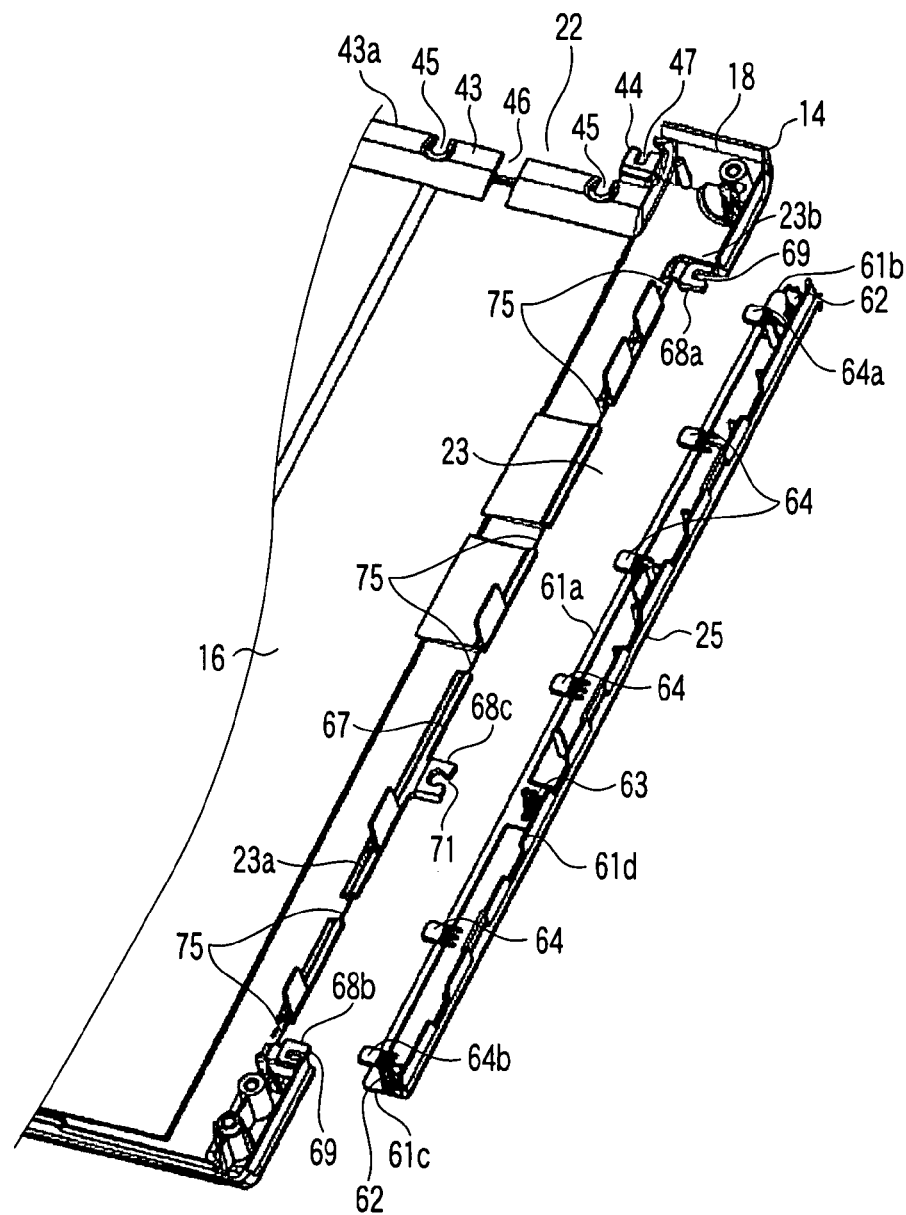
FIG. 18 is an exemplary perspective view showing positions of the display cover and the second antenna cover, in the first embodiment of the invention.
Figure 21:
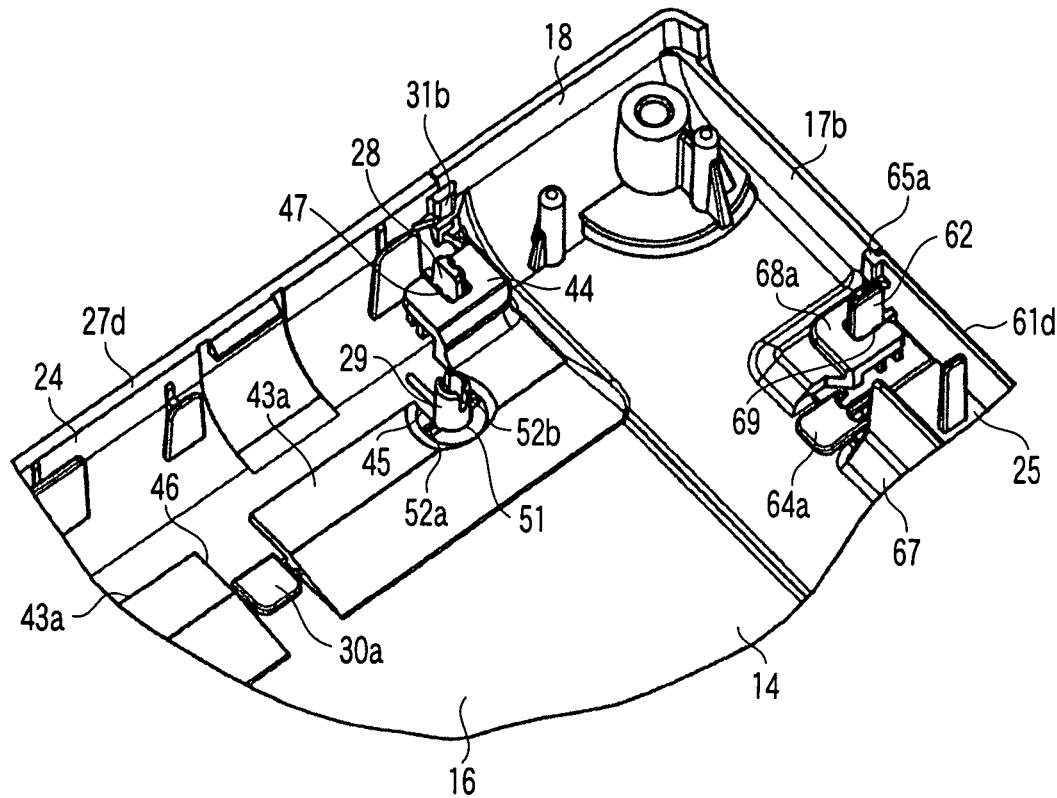
FIG. 21 is an exemplary perspective view showing the state that the first antenna cover and the second antenna cover are tentatively fixed to the display cover, in the first embodiment of the invention.
Figure 22:
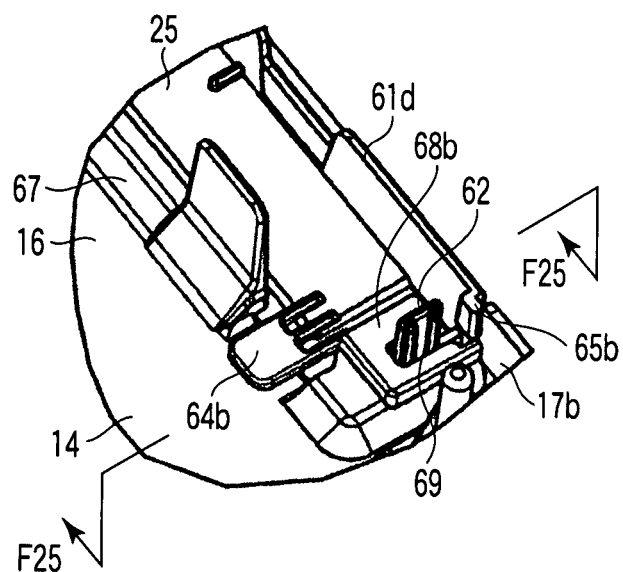
FIG. 22 is an exemplary perspective view showing the state that the second antenna cover is tentatively fixed to the display cover, in the first embodiment of the invention.

On the other hand, the second antenna cove 25 is shaped like a slender plate extending in the height (depth) direction of the display cover 14. As shown in FIG. 7 and FIG. 18, the second antenna cover 25 has first to fourth edge portions 61a, 61b, 61c and 61d. The first to third edge portions 61a, 61b and 61c of the second antenna cover 25 are butt against the first to third open edge portions 23a, 23b and 23c of the second opening 23. The fourth edge portion 61d of the second antenna cover 25 is butt against the display mask 15.

As shown in FIG. 18 to FIG. 20, the second antenna cover 25 has a pair of first projections 62, a second projection 63, two or more a first lock lugs 64, a second lock lug 65a, and a third lock lug 65b.

Each first projection 62 is shaped like a plate projecting from the inside of the second antenna cover 25. One first projection 62 is positioned at one end along the longitudinal direction of the second antenna cover 25, and adjacent to the second edge portion 61b of the second antenna cover 25. The other first projection 62 is positioned at the other end along the longitudinal direction of the second antenna cover 25, and adjacent to the third edge portion 61c of the second antenna cover 25.

Figure 23:
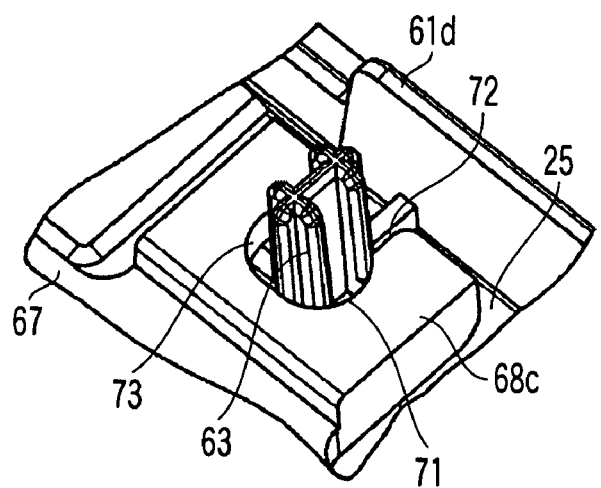
FIG. 23 is an exemplary perspective view showing the state that the second projection of the second antenna cover is inserted into the through portion of the display cover, in the first embodiment of the invention.
Figure 24:
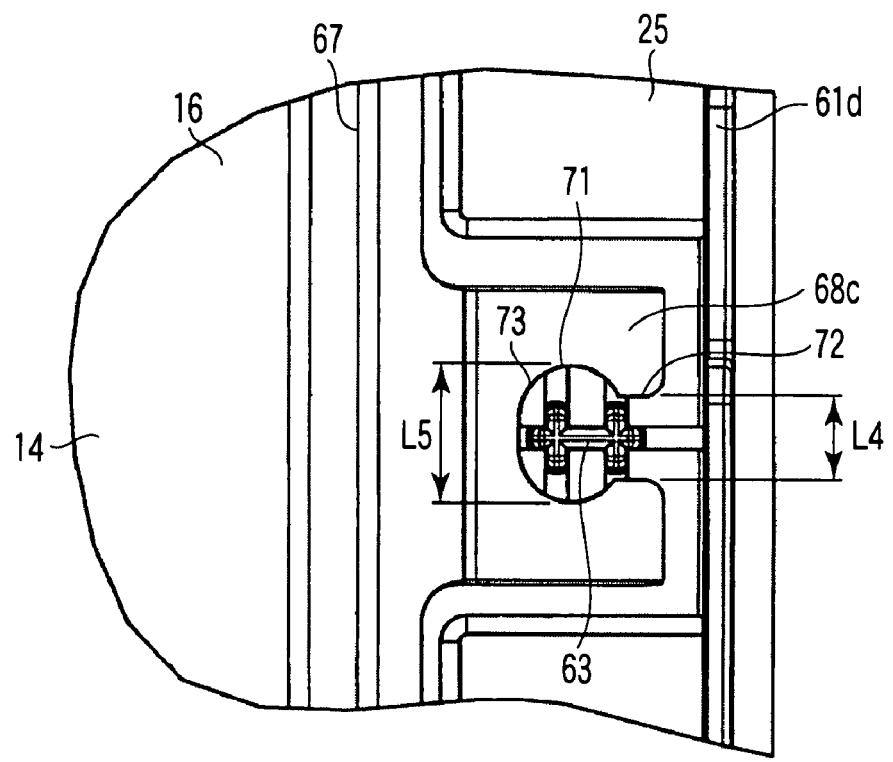
FIG. 24 is an exemplary plan view showing the state that the second projection of the second antenna cover is inserted into the through portion of the display cover, in the first embodiment of the invention.

The second projection 63 is positioned at the middle portion along the longitudinal direction of the second antenna cover 25. The second projection 63 is projected from the inside of the second antenna cover 25, and has a H-shaped cross section as shown in FIG. 23 and FIG. 24. The second projection 63 is adjacent to the first edge portion 61a of the second antenna cover 25.

Figure 25:
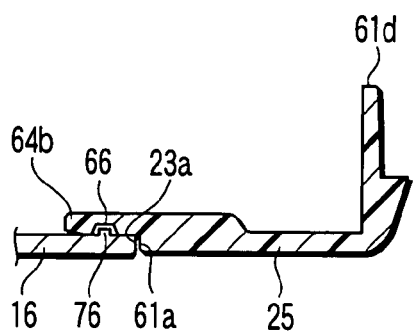
FIG. 25 is an exemplary sectional view taken along lines F25-F25 of FIG. 22.

The first lock lugs 64 are projected to the support wall 16 of the display cover 14 from the first edge portion 61a of the second antenna cover 25. The first lock lugs 64 are arranged in a line with space in the longitudinal direction of the second antenna cover 25. Among the first lock lugs 64, the first lock lug 64a positioned at one end along the longitudinal direction of the second antenna cover 25 and the first lock lug 64b positioned at the other end along the longitudinal direction of the second antenna cover 25 have a recess 66. As shown in FIG. 25, each recess 66 is formed on the outside of the first lock lugs 64a and 64b, and extended in the direction orthogonal to the projecting direction of the first lock lugs 64a and 64b.

As shown in FIG. 19, the second lock lug 65a is positioned at one end along the longitudinal direction of the second antenna cover 25. The second lock lug 65a is projected sideways the second edge portion 61b of the second antenna cover 25.

As shown in FIG. 20, the third lock lug 65b is positioned at the other end along the longitudinal direction of the second antenna cover 25. The third lock lug 65b is projected outside the third edge portion 51c of the second antenna cover 25.

As shown in FIG. 18, the support wall 16 of the display cover 14 has a second cover support 67 as a part. The second cover support 67 is positioned at the first open edge portion 23a of the second opening 23, and projected therefrom to the inside of the second opening 23, like a flange.

The second cover support 67 has first to third tongue pieces 68a, 68b and 68c. As shown in FIG. 19, the first tongue piece 68a is extended from one end along the longitudinal direction of the first open edge portion 23a, to the second opening 23. As shown in FIG. 20, the second tongue piece 68b is extended from the other end along the longitudinal direction of the first open edge portion 23a, to the second opening 23. The third tongue piece 68c is extended from the middle portion along the longitudinal direction of the first open edge portion 23a, to the second opening 23. Therefore, the distal end edges of the first to third tongue pieces 68a, 68b and 68c are exposed to the second opening 23a, and acted also as an outer peripheral edge forming a contour of the display cover 14.

The first and second tongue pieces 68a and 68b have a slit 69 opened at their distal end edges. Each slit 69 corresponds to the first projections 62 of the second antenna cover 25, and has an opening width to permit insertion of the first projections 62.

As shown in FIG. 18, FIG. 23 and FIG. 24, the third tongue piece 68c has a through portion 71. The through portion 71 corresponds to the second projection 63 of the second antenna cover 25, and has an inlet 72 and a terminal end 73. The inlet 72 is opened at the distal end edge of the third tongue piece 68c, and has the opening width L4 to permit insertion of the second projection 63. The terminal end 73 is connected to the inlet 72. Further, the terminal end 73 is shaped like an ellipse extending in the direction of the first open edge portion 23a of the second opening 23. The opening width L5 of the terminal end 73 is wider than the opening width L4 of the inlet 72.

In other words, the through portion 71 is shaped like a groove made by cutting the third tongue piece 68c, so that the terminal end 73 becomes wider than the inlet 72. Therefore, the second projection 63 of the second antenna cover 25 can be inserted into the through portion 71 from either direction axial to the through portion 71 or direction crossing the axial direction.

The second cover support 67 has notches 75. The notches 75 are arranged in a line with space in the height direction of the display cover 14 so as to correspond to the first lock lugs 64 of the second antenna cover 25. Each notch 75 has an opening width to permit insertion of the first lock lug 64.

As shown in FIG. 19 and FIG. 20, a pair of lock projections 76 is formed in the support wall 16 of the display cover 14. The lock projections 76 corresponds to the notches 75 positioned at one end and the other end along the height direction of the display cover 14. The lock projections 76 are projected from the inside of the support wall 16 just like facing the notches 75, and extended in the height direction of the display cover 14.

The second antenna cover 25 is inserted into the second opening 23 from the direction of the right sidewall 17b of the display cover 14. Then, the first projections 62 of the second antenna cover 25 fits into the slits 69 of the first and second tongue pieces 68a and 68b, and the second projection 63 fits into the terminal end 73 of the through portion 71 through the inlet 72.

Further, the first lock lugs 64 of the second antenna cover 25 fits into the notches 75. The first lock lugs 64 are passed over the first open edge portion 23a, and laid on the inside of the support wall 16. At the same time, the second cover support 67 of the display cover 14 is laid on the second antenna cover 25.

The first lock lugs 64a and 64b positioned at one end and the other end of the second antenna cover 25 have the recesses 66. The recesses 66 hangs on the lock projections 76 projecting from the inside of the support wall 16, following the insertion of the second antenna cover 25.

When the first edge portion 61a of the second antenna cover 25 reaches the position just before the first open edge portion 23a of the second opening 23, the second and third lock lugs 65a and 65b of the second antenna cover 25 ride over the second and third open edge portions 23b and 23c of the display cover 14, and elastically hang on the sidewall 17b.

As a result, the second antenna cover 25 is tentatively locked to the display cover 14 through the first to third lock lugs 64, 65a and 65b. Therefore, the second antenna cover 25 is held at a fixed position of the display cover 14, and the second antenna cover 25 is prevented from displacing from the display cover 14.

Further, the first projections 62 are held in the state inserted into the slits 69, and the positions of the first projections 62 against the slits 69 are fixed. Similarly, the second projection 63 is held in the state inserted into the through portion 71, and the position of the second projection 63 against the through portion 71 is fixed.

In the state that the second antenna cover 25 is tentatively fixed to the display cover 14, press the heating heads of the heating unit to the distal ends of the first projections 62 projecting from the slits 69 and the distal end of the second projection 63 projecting from the through portion 71. Then, the first and second projections 62 and 63 are molten and thermally crushed.

Figure 26:
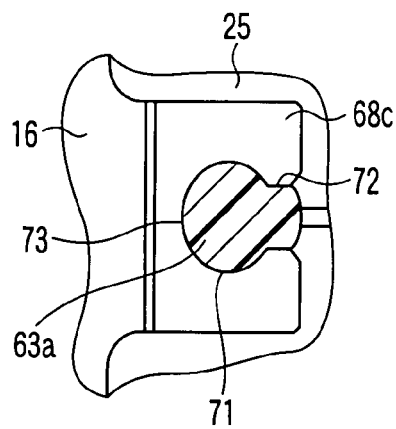
FIG. 26 is an exemplary sectional view showing the state that molten resin is filled in the through portion, in the first embodiment of the invention.

When the first projections 62 are heated, molten resin is spread over the first and second tongue pieces 68a and 68b, and filled in the slits 69. Similarly, when the second projection 63 is heated, molten resin is spread over the third tongue piece 68c, and filled in the through portion 71 as shown in FIG. 26. When the molten resin is hardened in the through portion 71, the second antenna cove 25 is fixed to the display cover 14 in the state clogging the second opening 23.

According to the first embodiment of the invention, the slits 47 for insertion of the first projections 28 of the first antenna cover 24 are formed at the distal end edges of the tongue pieces 44, and has the opening width to permit insertion of the first projections 28. The through portions 45 for insertion of the second projections 29 of the first antenna cover 24 has the inlets 50 formed at the front end edges 43a of the first cover support 43. The inlets 50 has the opening width L1 to permit insertion of the second projections 29.

Therefore, the first projections 28 can be inserted into the slits 47 from the side of the display cover 14. Similarly, the second projections 29 can be inserted into the through portions 45 from the side of the display cover 14.

In addition, as the slits 47 penetrates the tongue pieces 44, the first projections 28 can be inserted into the slits 47 from the axial direction. As the through portions 45 penetrates the first cover support 43 of the display cover 14, the second projections 29 can be inserted into the through portions 45 from the axial direction. As a result, the first antenna cover 24 can be installed in the display cover 14 from two directions.

Likewise, the slits 69 for insertion of the first projections 62 of the second antenna cover 25 are formed at the distal end edges of the first and second tongue pieces 68a and 68b, and has the opening width to permit insertion of the first projections 62. The through portion 71 for insertion of the second projection 63 of the second antenna cover 25 has the inlet 72 formed at the distal end edge 68c of the third tongue piece 68c. The inlet 72 has the opening width L4 to permit insertion of the second projection 63.

Therefore, the first projections 62 can be inserted into the slits 69 from the side of the display cover 14. Similarly, the second projection 63 can be inserted into the through portion 71 from the side of the display cover 14.

In addition, as the slits 69 penetrates the first and second tongue pieces 68a and 68b, the first projections 62 can be inserted into the slits 69 from the axial direction. As the through portion 71 penetrates the third tongue piece 68c, the second projection 63 can be inserted into the through portion 71 from the axial direction. As a result, the second antenna cover 25 can be installed in the display cover 14 from two directions.

Therefore, the restriction on the installing direction of the first and second antenna covers 24 and 25 is decreased, and the workability in assembling the display unit 3 is improved.

According to the first embodiment, the through portions 45 for insertion of the second projections 29 of the first antenna cover 24 has grooves 52a and 52b extending in the direction orthogonal to the insertion direction of the second projections 29, in the terminal ends 51. By these groove 52a and 52b, the opening width L2 of the terminal end 51 is wider than the opening width L1 of the inlet 50.

Therefore, when the heating head is pressed to the second projection 29, the molten resin 29a flows into both grooves 52a/52b and open end of the inlet 50, and coagulates there at the same time, as shown in FIG. 15 to FIG. 17.

Even if a force to displace the second projections 29 toward the inlets 50 is applied to the first antenna cover 24, the resin 29a coagulated in the grooves 52a/52b and through portion 45 resists the above force.

Therefore, by thermally crushing the distal ends of the second projections 29, movement of the first antenna cover 24 in the axial direction and radial direction of the second projections 29 can be restricted. Therefore, the first antenna cover 24 can be firmly fixed to the display cover 14.

In the through portion 71 for insertion of the second projection 63 of the second antenna cover 25, the opening width L5 of the terminal end 73 is wider than the opening width L4 of the inlet 72. Therefore, when the second projection 63 is led to the terminal end 73, a clearance is generated between the outer periphery of the second projection 63 and the open edge of the terminal end 73.

As a result, when the heating head is pressed to the second projection 63, the molten resin 63a flows between the second projection 63 and the terminal end 73, and flows into the open end of the inlet 72, and coagulates there at the same time.

Even if a force to displace the second projection 63 toward the inlet 72 is applied to the second antenna cover 25, the resin 63a coagulated between the second projection 63 and the terminal end 73 resists the above force.

Therefore, by thermally crushing the distal end of the second projection 63, movement of the second antenna cover 25 in the axial direction and radial direction of the second projection 63 can be restricted. Therefore, the second antenna cover 25 can be firmly fixed to the display cover 14.

In addition, the second antenna cover 25 is fixed to the display cover 14 by thermally crushing the first and second projections 62 and 63. Therefore, though the structure that the second antenna cover 25 is inserted into the second opening 23 from the side of the display cover 14, a metallic screw can be eliminated from the part of fixing the second antenna cover 25.

Therefore, the metallic screw does not exist near the antenna elements 21d and 21e, and a bad influence to the antenna characteristic can be avoided.

According to the first embodiment, the first antenna cover 24 is tentatively fixed to the display cover 14 in the state covering the first opening 22, by hanging the first to third lock lugs 30, 31a and 31b on the display cover 14.

Likewise, the second antenna cover 25 is tentatively fixed to the display cover 14 in the state covering the second opening 23, by hanging the first to third lock lugs 64, 65a and 65b on the display cover 14.

Therefore, when the second projections 28 and 63 are thermally crushed, the first and second antenna covers 24 and 25 are prevented from displacing from the fixed position of the display cover 14. As a result, a step or clearance is difficult to generate in the boundary area between the display cover 14 and first antenna cover 24, and in the boundary area between the display cover 14 and second antenna cover 25. Therefore, the appearance of the portable computer 1 is improved.

Further, the through portions 45 for insertion of the second projections 29 of the first antenna cover 24 are opened at the front end edge 43a of the first cover support 43. Therefore, compared with the case that each through portion is a simple hole, the part combining the second projections 29 with the through portions 45 can be displaced to the outer periphery direction of the display cove 14.

In other words, the shape of the first opening 22 is made as small as possible, and the first antenna cover 24 is made compact. Therefore, the first antenna cover 24 becomes inconspicuous, and favorable for the appearance of the portable computer 1.

The present invention is not to be limited to the abovementioned first embodiment. The invention may be embodied in other modifications without departing from the spirits of the invention.

Figure 27:
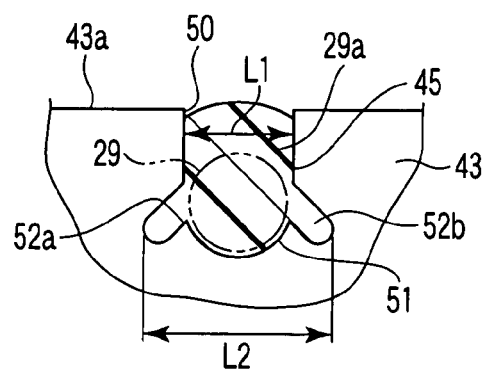
FIG. 27 is an exemplary sectional view showing the state that molten resin is filled in a through portion, in a second embodiment of the invention.

For example, FIG. 27 shows a second embodiment of the invention. In the second embodiment, the grooves 52a and 52b formed in the terminal end 51 of the through portion 45 are extended from the position in the terminal end 51 where they are opposite to each other, toward the opposite side of the inlet 50. The grooves 52a and 52b are inclined in the direction separated from each other, as they are moved away from the inlet 50.

Even in this structure, when the heating head is pressed to the second projection 29, the molten resin 29a flows into both grooves 52a/52b and open end of the inlet 50, and coagulates there at the same time, as shown in FIG. 27. Therefore, the second projection 29 is prevented from coming off the inlet 50 of the through portion 45.

Figure 28:
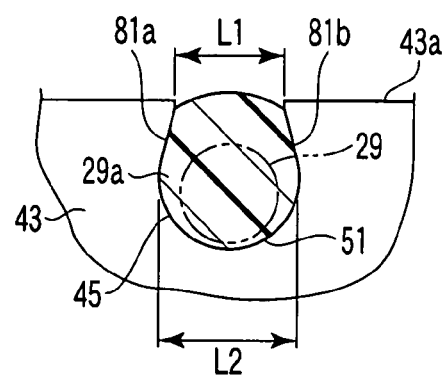
FIG. 28 is an exemplary sectional view showing the state that molten resin is filled in a through portion, in a third embodiment of the invention.

FIG. 28 shows a third embodiment of the invention.

The through portion 45 of the third embodiment has a pair of open side edge portions 81a and 81b connecting the inlet 50 and the terminal end 51. The opening width L2 of the terminal end 51 is wider than the opening width L1 of the inlet 50. The open side edge portions 81a and 81b are inclined to be close to each other in the direction from the terminal end 51 to the inlet 50. By this inclined structure, the through portion 45 is made wider in the direction from the inlet 50 to the terminal end 51.

In the above configuration, when the heating head is pressed to the second projection 29, the molten resin 29a flows into the clearance between the second projection 29 and the through portion 45, and coagulates there at the same time as shown in FIG. 28. As the open side edge portions 81a and 81b of the through portion 45 are inclined in the direction of inserting the second projection 29, the coagulated resin is hung on the open side edges 81a and 81b. Therefore, the second projection 29 can be prevented from coming off of the inlet 50 of the through portion 45.

In the first embodiment described hereinbefore, the diameter of any one of second projections may be a little larger than the opening width of the inlet. In this configuration, the second projection is inserted into the through portion while its outer periphery is cut away by the contact with the edge of the through portion. Therefore, the first antenna cover is prevented from rattling by a frictional resistance generated in the contacting part between the through portion and second projection, and the first antenna cover can be easily installed.

In addition, the invention is not specified to the structure that the first and second antenna covers are fixed to the display cover. The invention may be applied to a structure that a front cover made of synthetic resin having an infrared port is fixed to a first housing made of metal, for example.

The materials of the first and second parts are not limited to those described in the first embodiment. For example, both first and second parts may be formed by thermoplastic synthetic resin or metallic material. When the first part having a projection is made of metallic material, aluminum alloy is desirable, or at least distal end of a projection is desirably made of solder.

An electronic apparatus according to the invention is not specified to a portable computer. The invention is applicable to other electronic apparatus, such as a portable information terminal device, for example.

While certain embodiments of the inventions have been described, there embodiments have been presented by way of example only, and are not intended to limit the scope of the invention. Indeed, the novel methods and systems described herein may be embodied in a variety of other forms; furthermore various omissions, substitutions and changes in the form of the methods and systems described herein may be made without departing form the spirit of the inventions. The accompanying claims and their equivalents are intended to cover such form or modifications as would fall within the scope and sprit of the inventions.

What is claimed is:

1. A parts combining structure comprising:
a first part having a thermoplastic projection; and
a second part having a through portion to insert the projection, the second part combined with the first part by thermally crushing the distal end of the projection projecting from the through portion,
wherein the through portion of the second part includes an inlet opened in the outer peripheral edge of the second part, and the inlet has an opening width to permit insertion of the projection.

2. The parts combining structure according to claim 1, wherein the projection is led from the inlet to the through portion.

3. The parts combining structure according to claim 2, wherein the through portion has a terminal end continuing to the inlet, and the terminal end is made wider than the inlet.

4. The parts combining structure according to claim 3, wherein when the distal end of the projection is heated and thermally crushed, molten material is filled in the through portion.

5. The parts combining structure according to claim 3, wherein the terminal end of the through portion includes a groove extending in the direction crossing the direction of inserting the projection inserted from the inlet, and when the distal end of the projection is heated and thermally crushed, molten material is filled in the groove.

6. The parts combining structure according to claim 2, wherein the through portion has a terminal end continuing to the inlet, and is made wider in the direction from the inlet to the terminal end.

7. The parts combining structure according to claim 6, wherein when the distal end of the projection is heated and thermally crushed, molten material is filled in the through portion.

8. The parts combining structure according to claim 2, wherein the first part has a lock lug projecting to the second part, and the lock lug defines the relative positions of the first part and second part by hanging on the second part, when the projection is led from the inlet to the terminal end.

9. The parts combining structure according to claim 1, wherein the first part is made of thermoplastic resin, and the second part is made of metal.

10. An electronic apparatus comprising:
a housing having a through portion; and
a cover having a thermoplastic projection, the projection penetrating the through portion of the housing, the cover fixed to the housing by thermally crushing the distal end of the projection projecting from the through portion,
wherein the through portion of the housing includes an inlet opened in the outer peripheral edge of the housing, and the inlet has an opening width to permit insertion of the projection.

11. The electronic apparatus according to claim 10, wherein the projection is led from the inlet to the through portion.

12. The electronic apparatus according to claim 10, wherein the through portion includes a terminal end continuing to the inlet, and the terminal end is formed wider than the inlet, and molten material is filled in the through portion when the distal end of the projection is thermally crushed.

13. An electronic apparatus comprising:
a metallic housing having an opening;
an antenna element for radio communication housed in the housing to be corresponding to the opening; and
a synthetic resin antenna cover covering the opening,
wherein the antenna cover has a thermoplastic projection, the housing has a through portion to insert the projection, the housing and antenna cover are fixed by thermally crushing the distal end of the projection projecting from the through portion, the through portion of the housing includes an inlet in the open edge portion of the opening, and the inlet has an opening width to permit insertion of the projection.

14. The electronic apparatus according to claim 13, wherein the antenna cover has a lock lug projecting to the opening of the housing, the lock lug defines the relative positions of the housing and antenna cover by hanging on the housing, when the projection is led from the inlet to the through portion.

* * * * *